Figures 1, 2:
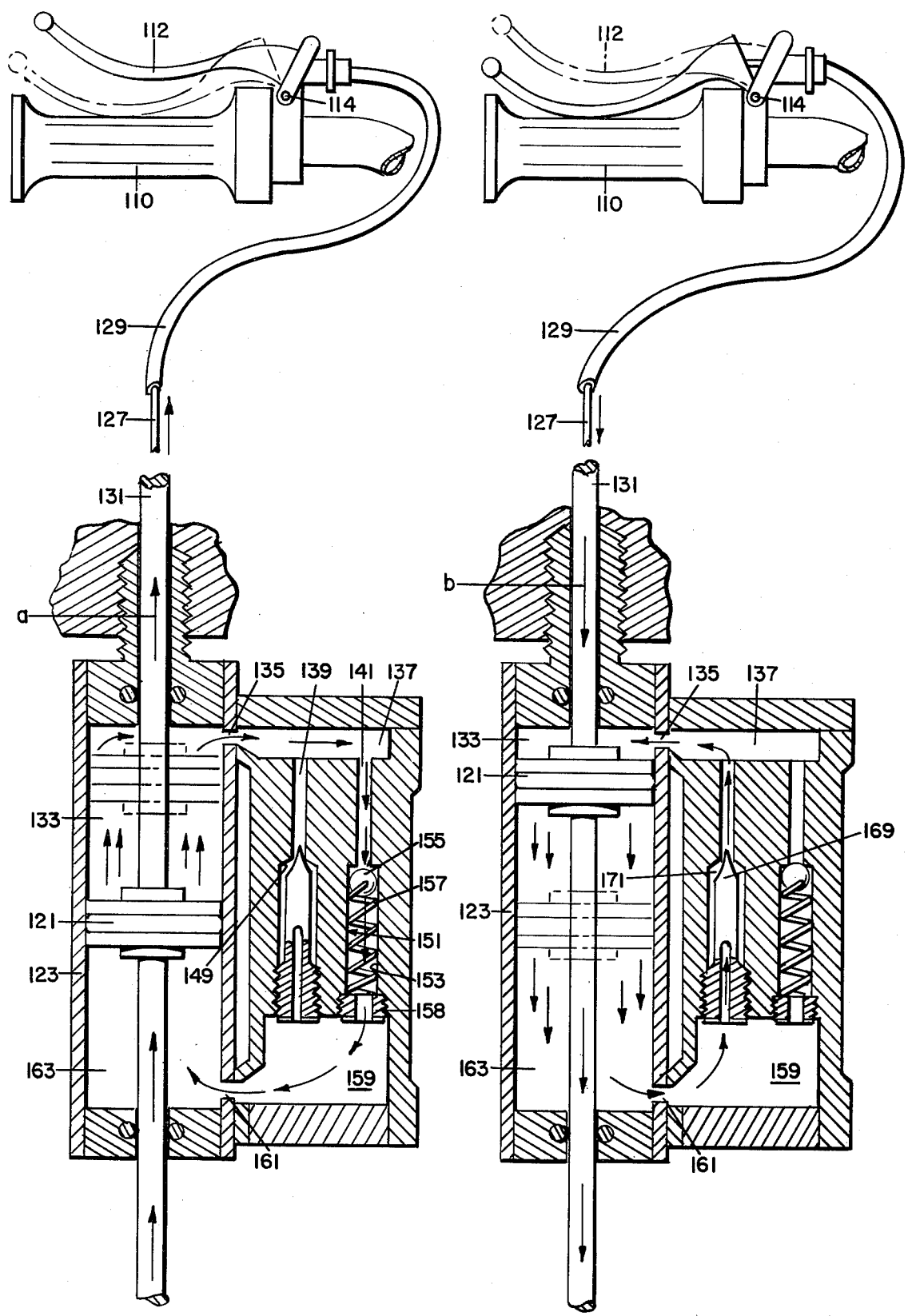

United States Patent [19]
Bolger

[11] 3,963,107
[45] June 15, 1976

[54] MOTORCYCLE CLUTCH WITH DASPOT

[76] Inventor: Joseph E. Bolger, Summer St., Barre, Mass. 01005

[22] Filed: Dec. 12, 1974

[21] Appl. No.: 531,909

[52] U.S. Cl. .......................... 192/109 D; 74/501 R; 188/313
[51] Int. Cl.² ........................................ F16D 57/00
[58] Field of Search ...................... 192/109 D, 89 A

[56] References Cited
UNITED STATES PATENTS 1,429,528 9/1922 Payne ............................ 192/109 D
2,074,510 3/1937 Junkers ........................... 192/109 D

FOREIGN PATENTS OR APPLICATIONS 877,742 9/1961 United Kingdom ............... 192/89 A

*Primary Examiner*—Benjamin W. Wyche
*Attorney, Agent, or Firm*—Ross, Ross & Flavin

[57] ABSTRACT

A safety means in an engine for providing a measured rate of clutch engagement in the event of clutch cable rupture or in the event an operator abuses his machine and initiates an almost instant engagement.

1 Claim, 2 Drawing Figures

MOTORCYCLE CLUTCH WITH DASPOT

The present invention relates generally to inventively novel and useful improvements and structural refinements in a safety device for providing a measured rate of clutch engagement upon any engine abuse by the operator or any clutch cable breakage.

The invention, in broader aspects, may be embodied in any device located in connection with and operative with a working component of an engine clutch. It relates particularly but not exclusively to a motorcycle. That is to say, and without intending to place undue limitations upon the scope of the instant invention, beyond what may be required by the state of the prior art, the particular embodiments may be described as embracing the concepts of hydraulic or pneumatic operation of a motorcycle clutching system.

In broadest sense, the invention is adapted for use in association with any power transmitting device operating by securing a driving continuity through a transmitting line inclusive of a driving clutch member with an associated prime mover and a driven clutch member with an associated load together with a coacting means for effecting a release of the driving engagement between the clutch members constituted by a handlebar-mounted and operator-operated clutch lever and a clutch cable connected to and driven by the actuation of the clutch lever and interconnecting between the clutch lever and power transmitting device. It comprises a novel improvement in a clutch control assemblage disposed between and operative with the clutch cable and a moving component of the power transmitting device and is rendered so operative upon vehicle abuse by way of too speedy clutch engagement or upon clutch cable rupture as to effect a measured degree of clutch engagement sufficient to enable the operator to bring or keep his vehicle under operational control.

If desired, the device of the invention could be located somewhere along the span of the clutch cable itself, and further if desired, the interaction between inner and outer cables could be exploited for achieving the requisite action with the outer cable being allowed to compress as tension is taken up by the lever.

A vehicle clutch is the means of disconnecting the engine from the transmission by way of squeezing the lever on the handlebar. Releasing the same lever causes the engine and transmission to be connected.

The clutch generally comprises a series of plates disposed in a stacked relation, one half of the series being driving members and one half of the series being driven members. When the clutch is engaged, a spring action is exploited to compress the plates together wherefor they spin unisonly, the engine being engaged with the transmission, and the cycle being driven.

When sitting, as for example while waiting for a light at an intersection, the sprocket drives the primary chain which is engaged with the clutch and the clutch basket is turning taking one half of the plates with it. The other half is stationary and in engagement with the gear box. Then when the handle lever is released, the clutch springs compress the plates so that they all move unitarily.

Clutch engagement/disengagement is accomplished over a relatively narrow range of clutch lever movement and smooth predictable operation can be difficult of attainment, even for a relatively experienced operator. The stalling and lurching forward of the machine are but two of the problems commonly encountered, with operator and/or passenger injury often resulting, not to mention vehicle damage.

Motorcycles have an exceedingly high power-to-weight ratio. Certain current models have exceedingly high horsepower and torque capabilities. Expensive repairs are often necessitated by deliberate or accidental clutch abuse, which, in turn, frequently stresses and damages component parts along the drive line to the rear wheel.

The safety device hereof aims to prevent operator injuries by providing a measured rate of clutch engagement. Accidental or deliberate sudden clutch engagement through abusive treatment is rendered impossible to initiate. Normal clutch operation, on the other hand, is not affected. The devices of the invention come into play only when and if the clutch lever is manipulated in any but a proper manner.

As envisioned, the invention would not prevent clutch engagement in the case of cable or fitting breakage, but would offer a type of engagement which would avoid the sense of panic for the operator in the respect that he would first hear his engine commence to labor and would feel his machine start to move away but within a time increment such that he would yet be enabled to bring his situation under control before his problems become so great as to, in a literal sense, devour him. That is, the invention is rendered operative to prevent the clutch from instantly engaging, thereby allowing the operator to take such measures as may be indicated as necessary or practical to bring his vehicle under control.

Normally, when and if a clutch cable ruptures, the machine is instantly set in motion. With a large displacement engine, such can be unbelievably dangerous. An operator could be half way through a busy intersection before he would have any hope of getting matters righted and his machine once again under control. Even for an experienced rider, the suddenness of the onset of such a trouble situation will likely find him making the wrong moves and grabbing at the wrong levers. The inherent dangers are all the more significant with motorcycles now commonly operative in the range of from 60 to 75 horsepower. Such engines may be less prone to simple stalling under the sudden loads of rapid clutch engagement, but they offer the disadvantage that such machines in all probability are more capable of the sudden take offs which this invention aims to prevent.

The system herein envisioned offers the advantage that the assemblage could be employed inside the engine, say on the clutch operating rod passing through the transmission mainshaft, a particularly advantageous region inasmuch as same is generally immersed in oil.

Alternatively, the assemblage could be transferred to any convenient and reasonable location closely adjacent a moving element or component of the clutch system.

The herein disclosed preferred embodiment is presented only for purposes of exemplification, it being appreciated that the invention is susceptible of incorporation in other structurally modified forms coming equally within the scope of the claims hereof.

Drawings depicting such preferred construction have been annexed as a part of this disclosure, and in such drawings:

FIG. 1 is a fragmentary view in side elevation of the hydraulic or pneumatic system showing the clutch lever in forward or engaged position; and FIG. 2 is a similar view showing the clutch lever and piston holding the vehicle clutch in disengaged position.

A handlebar 110 is shown with a clutch lever 112 pivotally connected thereto as at 114.

The clutch lever is shown, in FIG. 1, in the forward engaged and operative position in solid line.

A piston 121, reciprocable within a hydraulic or pneumatic unit 123, is positioned at the approximate mid-point of a piston chamber and is normally held thereat by the inherent spring tension of the vehicle clutch.

As clutch lever 112 is drawn toward handlebar 110 into a clutch-disengaged position, an inner cable 127 sheathed by an outer covering 129 is drawn upwardly so as to carry a piston shaft 131 to which it is strategically attached in the direction indicated by arrow $a$, thus disengaging the vehicle clutch.

The upward piston travel forces an oil or air charge in upper piston chamber 133 outwardly thereof through a port 135 and into an auxiliary chamber 137 communicating therewith.

Two parallel outlets 139 and 141 lead from auxiliary chamber 137, each leading to a valve bore 149 and 151 respectively.

A valve unit is enclosed within valve bore 151 and includes a ball valve 155 normally held in sealing position adjacent outlet 141 by a spring 157 which is sealed within the valve bore by means of an apertured cap 158 threadedly engaged with the lower end of the valve bore.

Spring 157 is of a stiffness such as to offer only a minimum resistance to the oil or air flow and readily yields downwardly so as to insert ball valve 155 when the pressure flow of oil or air is downwardly through outlet 141.

Under such conditions, the oil or air flows downwardly past ball valve 155 and outwardly of valve bore 151 through the provided aperture in cap 158 and into a secondary auxiliary chamber 159 and then returnably through a port 161 to a lower piston chamber 163 of hydraulic unit 123.

At this point, clutch disengagement is complete with piston 121 in the position shown in FIG. 1 in dotted lines in the upper portion of the chamber and clutch lever 112 in the lower position as shown in FIG. 1 in dotted lines.

FIG. 2 shows clutch lever 112 and piston 121 holding the vehicle clutch in disengaged position. Both clutch lever and piston are indicated by solid lines.

As the clutch lever is released, to assume the position in dotted lines in FIG. 2, the inherent spring tension generated by the vehicle clutch pushes piston shaft 131 and its connected piston 121 downwardly so as to force the oil or air in the direction indicated by the several arrows.

From lower piston chamber 163, the oil or air is now forced through opening 161 to secondary auxiliary chamber 159. Ball valve 155 and spring 157 now offer such resistance as to block off any flow of oil or air in this direction through this valve unit.

A valve unit is encased within a valve bore 149 and includes a partially hollow nozzle 169 which is adjustably held in threaded engagement with the lower end of the valve bore.

The nozzle offers an adjustable resistance to the flow of oil or air as it flows from lower piston chamber 163 through port 161 into secondary auxiliary chamber 159 and thence upwardly through the partial bore of nozzle 169 and outwardly into an annular space 171 between the wall of valve bore 149 and the outer wall of the nozzle and thence through outlet 139 and into primary auxiliary chamber 137 and thence returnably through port 135 to upper piston chamber 133 to complete the operational cycle.

Nozzle 169 provides an adjustable resistance to the return flow of the oil or air, which in turn acts directly and in like manner on piston 121 and its piston shaft 131 which is connected to the vehicle clutch. This prevents the possibility of any sudden or spasmodic engagement with reference to the clutch proper.

The device may be easily adjustable so that the engagement rate may be varied within reasonable limits, allowing for example, a faster rate of engagement for experienced riders and a slower rate of engagement for novices.

When the clutch is thrown out, the movement of the piston is upwardly toward the dash line position shown in FIG. 1 with the oil or air being forced downwardly through outlet 141 and past the valve, outwardly through the aperture in cap 158, and returnably to lower piston chamber 163.

When the clutch is let in, the movement of the piston is downwardly as shown in FIG. 2 with the generated pressure forcing the oil or air through outwardly of lower piston chamber 163 and upwardly through nozzle 169 and outwardly of outlet 139 and returnably to upper piston chamber 133.

No matter what the operator does at the lever, herewith we achieve a measured rate of engagement with the danger of damage to the drive line of the vehicle being minimized.

Thus a manufacturer has a greater degree of control over the way his vehicle is handled by operators, the retarding effect assuring a measured rate of engagement and hence a degree of control.

In other words, with the clutch lever in the forward position, the vehicle clutch is engaged and operative and the piston in the hydraulic unit is positioned at approximately mid-point in the piston chamber, being held thus by the spring tension in the vehicle clutch. As the clutch lever is drawn toward the handlebar grip, the inner cable is drawn upward carrying the piston shaft therewith, thereby disengaging the vehicle clutch. This upward travel of the piston forces the oil in the upper piston chamber into the auxiliary chamber and past the spring loaded ball valve. The oil then flows into the auxiliary chamber and through the opening back into the lower piston chamber. At this point, clutch disengagement is complete, with the piston and the clutch lever in the positions as shown by dotted lines in FIG. 1.

With the clutch lever and piston holding the vehicle clutch in disengaged position, as indicated in FIG. 2 by solid lines, the lever is released. Spring tension from the vehicle clutch pushes the piston shaft downwardly, forcing oil from the lower piston chamber through the opening into the auxiliary chamber and into the hollow nozzle so designed as to offer an adjustable resistance to the flow of oil as it passes through the nozzle and chamber back into the piston chamber.

By nature of its construction the nozzle provides an adjustable resistance to the return flow of oil, which in turn acts directly and in like manner on the piston and its shaft connected to the vehicle clutch. This prevents the possibility of sudden or spasmodic engagement with respect to the clutch, thereby minimizing the danger of the vehicle getting out of control and possibly injuring the operator and/or damaging his vehicle.

I claim:

1. In a clutch assembly of a motorcycle including driving and driven clutch members and cooperant means for effecting the release of the driving engagement between the clutch members inclusive of a handlebar-mounted and operator-operated clutch lever and a clutch cable connecting between the clutch lever and the distant clutch assembly, the improvement in a clutch control assemblage located between and operative with the clutch cable and the clutch assembly and rendered operative upon any sudden clutch cable rupture for effecting an adequate and measured degree of clutch engagement for enabling the operator to bring his vehicle under renewed operational control comprising:

a main cylinder, a piston connected to the clutch cable and being reciprocable within the main cylinder and dividing the main cylinder into variable clutch in and clutch out chambers as the piston is reciprocated alternately in clutch in and clutch out directions respectively, an auxiliary cylinder communicating with the main cylinder at each opposite side of the piston and having a ported wall for separating the auxiliary cylinder into clutch in and clutch out chambers, adjacent primary and secondary valve units mounted in the ports of the wall of the auxiliary chamber, with the primary valve unit allowing fluid flow through the clutch in chambers past the primary valve unit and through the clutch out chambers for the actuation of the piston in clutch in direction and with the secondary valve unit allowing fluid flow through the clutch out chambers past the secondary valve unit and through the clutch in chambers for the actuation of the piston in clutch out direction.

* * * * *